United States Patent
Gor et al.

(10) Patent No.: US 12,333,778 B2
(45) Date of Patent: Jun. 17, 2025

(54) METHOD AND SYSTEM FOR KEYPOINT DETECTION BASED ON NEURAL NETWORKS

(71) Applicant: Continental Autonomous Mobility Germany GmbH, Ingolstadt (DE)

(72) Inventors: Csaba Gor, Budapest (HU); Peter Rohoska, Budapest (HU); Andras Kalapos, Budapest (HU)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 416 days.

(21) Appl. No.: 17/996,894

(22) PCT Filed: Mar. 17, 2021

(86) PCT No.: PCT/EP2021/056887
§ 371 (c)(1),
(2) Date: Oct. 21, 2022

(87) PCT Pub. No.: WO2021/213742
PCT Pub. Date: Oct. 28, 2021

(65) Prior Publication Data
US 2023/0162472 A1    May 25, 2023

(30) Foreign Application Priority Data
Apr. 22, 2020 (EP) .................................. 20170909

(51) Int. Cl.
*G06V 10/46* (2022.01)
*G06V 10/764* (2022.01)
*G06V 10/82* (2022.01)
*G06V 20/59* (2022.01)

(52) U.S. Cl.
CPC .......... *G06V 10/462* (2022.01); *G06V 10/764* (2022.01); *G06V 10/82* (2022.01); *G06V 20/59* (2022.01)

(58) Field of Classification Search
CPC ...... G06V 10/462; G06V 20/59; G06V 10/82; G06V 10/764
See application file for complete search history.

(56) References Cited

U.S. PATENT DOCUMENTS

| | | | |
|---|---|---|---|
| 10,733,431 B2 * | 8/2020 | Zhang | G06N 7/00 |
| 12,142,023 B2 * | 11/2024 | Abbeloos | G06V 10/82 |
| 2021/0160536 A1 * | 5/2021 | Liu | H04N 19/176 |
| 2022/0277472 A1 * | 9/2022 | Birchfield | G06N 3/08 |
| 2023/0137337 A1 * | 5/2023 | Maji | G06V 10/82 |
| | | | 382/100 |
| 2023/0298204 A1 * | 9/2023 | Wang | G06T 19/20 |
| | | | 345/419 |

OTHER PUBLICATIONS

Zhou, Xingyi, Dequan Wang, and Philipp Krähenbühl. "Objects as points." arXiv preprint arXiv:1904.07850 (2019). (Year: 2019).*

(Continued)

*Primary Examiner* — Utpal D Shah

(57) ABSTRACT

The invention relates to a computer-implemented method for determining keypoints of multiple objects included in an image and associating the keypoints to the respective objects based on a neural network and a post processing system coupled with the neural network.

14 Claims, 5 Drawing Sheets

(56) References Cited

OTHER PUBLICATIONS

European Search Report dated Oct. 20, 2020 for the counterpart European Patent Application No. 20170909.4.

The International Search Report and the Written Opinion of the International Searching Authority mailed on Jun. 28, 2021 for the counterpart PCT Application No. PCT/EP2021/056887.

Zhe Cao et al: "Realtime Multi-Person 2D Pose Estimation using Part Affinity Fields", arxiv.org, Cornell University Library, 201 Olin Library Cornell University Ithaca, NY 14853, Nov. 24, 2016 (Nov. 24, 2016), XP080734074, DOI: 10.1109/CVPR.2017.143.

George Papandreou et al: "PersonLab: Person Pose Estimation and Instance Segmentation with a Bottom-Up, Part-Based, Geometric Embedding Model", Computer Vision—ECCV 2018: 15th European Conference, Munich, Germany, Sep. 8-14, 2018, Proceedings, Part XIV, Sep. 14, 2018 {Sep. 14, 2018), pp. 1-21, XP055611454, Cham DOI: 10.1007/978-3-030-01264-9 17 ISBN: 978-3-030-01264-9.

Bai Yang et al: "ACPNet:Anchor-Center Based Person Network for Human Pose Estimation and Instance Segmentation", 2019 IEEE International Conference on Multimedia and Expo (ICME), IEEE, Jul. 8, 2019 (Jul. 8, 2019), pp. 1072-1077, XP033590402, DOI: 10.1109/ICME.2019.00188.

Yu Xiang et al: "PoseCNN: A Convolutional Neural Network for 6D Object Pose Estimation in Cluttered Scenes", arxiv.org, Cornell University Library, 201 Olin Library, Cornell University Ithaca, NY 14853, Nov. 1, 2017 (Nov. 1, 2017), XP081319465.

Zhe Cao et al: "Realtime Multi-Person 2D Pose Estimation using Part Affinity Fields" arXiv: 1611.08050v2 [cs.CV] Apr. 14, 2017.

Zhe Cao et al: "Realtime Multi-Person 2D Pose Estimation using Part Affinity Fields", arXiv: 1812.08008v2 [csCV] May 30, 2019.

Xingyi Zhou et al., "Objects as Points," Computer Vision and Pattern Recognition, Apr. 16, 2019, arXiv:1904.078502v2 [cs.CV].

\* cited by examiner

◇ Detected keypoints
↙ Centroid offset vector
○ Centroid

METHOD AND SYSTEM FOR KEYPOINT DETECTION BASED ON NEURAL NETWORKS

CROSS-REFERENCE TO RELATED APPLICATIONS

The present application is a National Stage Application under 35 U.S.C. § 371 of International Patent Application No. PCT/EP2021/056887 filed on Mar. 17, 2021, and claims priority from European Patent Application No. 20170909.4 filed on Apr. 22, 2020, in the European Patent Office, the disclosures of which are herein incorporated by reference in their entireties.

TECHNICAL FIELD

The present invention relates generally to the field of neural networks, specifically deep neural networks. More specifically, the invention relates to a method and a system for detecting keypoints of multiple objects included in an image and associating the keypoints to the respective objects based on a neural network. The neural network may be, for example, a convolutional neural network.

BACKGROUND

Keypoint detection aiming to locate a predefined set of points of an object present on the image and group them to individual object instances is a challenging task, specifically in automotive applications. By detecting keypoints of objects like pedestrians, cyclists, vehicles, etc., it is possible to determine the pose of the object with respect to the line of sight of a camera. In addition, skeleton detection of one or more persons included in an image provided by a camera is possible.

Specifically in vehicles, computational resources are limited. Nevertheless, in automotive applications like autonomous or at least partly assisted driving applications, it is necessary to detect keypoints, group the keypoints and associate the grouped keypoints to objects in real-time (e.g., with a delay of 0.1 s or less) because based on detected object keypoints or poses, decisions have to be made promptly.

Zhe Cao, Tomas Simon, Shih-En Wei, and Yaser Sheikh, "Realtime Multi-Person 2D Pose Estimation using Part Affinity Fields," Computer Vision and Pattern Recognition, 24 Nov. 2016, discloses predicting gaussian confidence maps centered around the location of keypoints of interest. Relating the keypoints to person instances was done in two steps: first, by introducing directed connections between keypoints, they formed a complete skeleton, then tried to locate the connections by predicting vector fields aligned with them. After finding all valid connections, discrete skeletons could be reconstructed by joining the connections which shared keypoints with each other.

The main disadvantage of the pose estimation algorithm proposed by Cao et al. is the computational complexity of an upscaling algorithm using bicubic pixel interpolation and computational complexity of post processing which groups keypoints and associates the grouped keypoints to object instances.

Xingyi Zhou, Dequan Wang, and Philipp Krähenbühl, "Objects as Points," Computer Vision and Pattern Recognition, 16 Apr. 2019, discloses an algorithm which detects centroids for objects on the image, relates keypoint predictions to these centroids and predicts the offsets of the keypoints relative to the centroid. The proposed method is unable to handle cases where keypoints are missing for object instances (e.g. missing knees and ankles because the lower portions of legs are missing). In case of missing keypoints, they are forced to also predict missing keypoints of a person on the image, thus creating a high number of false positive keypoint detections.

SUMMARY

It is an objective of the embodiments of the present disclosure to provide a method for detecting keypoints of multiple objects included in an image and associating the keypoints to the respective objects which on the one hand requires low computational resources and, on the other hand, is less prone to false positive keypoint detections. The objective is addressed by the features of the independent claims. Embodiments are given in the dependent claims. If not explicitly indicated otherwise, embodiments of the present disclosure can be freely combined with each other.

According to an aspect, the present disclosure refers to a method for determining keypoints of multiple objects included in an image and associating the keypoints to the respective objects. The method is performed based on a neural network and a post processing system coupled with the neural network. The method includes the following steps.

First, confidence heatmaps are provided by the neural network. Each confidence heatmap provides information regarding the rough location of keypoints of interest. More in detail, each confidence heatmap may be a Gaussian or Gaussian-like distribution which is centered around the location of a certain keypoint. The confidence heatmap may include a lower resolution compared to the resolution of the image provided as an input to the neural network. Thereby, computation complexity is reduced which comes with the disadvantage of lower accuracy. Thus, the confidence heatmap can only provide the rough location of the keypoint due to the reduced resolution or scale of the confidence heatmap.

In addition, refinement offset vectors are provided by the neural network. Each refinement offset vector is associated with a certain keypoint and provides information for refining the rough location of the associated keypoint which is indicated by the confidence heatmap. A refinement offset vector is a vector, specifically, a two-dimensional vector which provides directional information where the keypoint is located exactly with respect to the rough location of the keypoint indicated by the confidence heatmap. More in detail, the confidence heatmap may be a probability distribution, i.e., provides values indicative for the probability that at a respective position of the image a keypoint is located. The confidence heatmap includes a maximum value which indicates—due to the lower resolution of the confidence heatmap—a rough location of the keypoint. After adding the refinement offset vector to the location of maximum value of the confidence heatmap, a refined location of the keypoint is obtained. For example, if the confidence heatmap indicates that the rough location of the keypoint is (x=2, y=2) and refinement offset vector has the values (0.1, 0.8), the refined location of the keypoint can be obtained by adding the values of refinement offset vector to the values of rough location of the keypoint, thereby obtaining (2.1, 2.8) as the refined location of the keypoint.

In addition, either a set of centroid offset vectors or one or more centroid confidence heatmaps together with centroid refinement offset vectors are provided by the neural network. In case of the first alternative, each centroid offset vector of the set of centroid offset vectors is associated with a certain keypoint and provides information regarding the distance and direction between the keypoint and the centroid of the object to which the keypoint belongs. More in detail, the position of the centroid of an object can be obtained by adding the values of the centroid offset vector to the location of the keypoint. The location of the keypoint may be the rough location of the keypoint (i.e. the location of the maximum value of confidence heatmap without adding the refinement offset vector) or the exact location of the keypoint (i.e. the location resulting from the summation of refinement offset vector to the maximum value of confidence heatmap).

In case of the second alternative, each centroid confidence heatmap provides information regarding the rough location of a centroid. More in detail, each centroid confidence heatmap may be a Gaussian or Gaussian-like distribution which is centered around the location of a certain centroid. The centroid confidence heatmap may be a probability distribution, i.e., provides values indicative for the probability that at a respective position of the image a centroid is located. The centroid confidence heatmap may include a lower resolution compared to the resolution of the image provided as an input to the neural network. Thereby, computation complexity is reduced which comes with the disadvantage of lower accuracy. Thus, the centroid confidence heatmap can only provide the rough location of a centroid due to the reduced resolution or scale of the centroid confidence heatmap.

Each centroid refinement offset vector is associated with a centroid and provides information for refining the location of the associated centroid. A centroid refinement offset vector is a vector, specifically, a two-dimensional vector which provides directional information where the centroid is located exactly with respect to the rough location of the centroid indicated by the centroid confidence heatmap. More in detail, the centroid confidence heatmap includes a maximum value which indicates—due to the lower resolution of the centroid confidence heatmap—a rough location of the centroid. After adding the centroid refinement offset vector to the location of maximum value of the centroid confidence heatmap, a refined location of the centroid is obtained. For example, if the centroid confidence heatmap indicates that the rough location of centroid is (x=3, y=3) and centroid refinement offset vector has the values (0.2, 0.7), the refined location of the centroid can be obtained by adding the values of centroid refinement offset vector to the values of rough location of the centroid, thereby obtaining (3.2, 3.7) as the refined location of the centroid.

In post processing, information provided by the neural network is processed.

The location of maximum value in the respective confidence heatmaps is determined in order to obtain rough keypoint locations. The rough keypoint locations are refined based on information included in refinement offset vectors. More in detail, the location of maximum value of a confidence heatmap indicates the rough location of a keypoint. By adding the refinement offset vector to the rough location of a keypoint, a refined location of keypoint is obtained.

In addition, the centroid of objects is determined either by applying centroid offset vectors to the keypoint locations or by refining the rough centroid location provided by centroid confidence heatmaps based on centroid refinement offset vectors. More in detail, the location of maximum value of a centroid confidence heatmap indicates the rough location of a centroid. By adding the centroid refinement offset vector to the rough location of a centroid, a refined location of centroid is obtained.

Finally, keypoints are grouped to the objects based on the determined centroids of the objects thereby associating sets of keypoints to respective objects. The association of the objects can be performed in different ways. For example, the information provided by the centroid offset vector may be used for associating a keypoint to a centroid and therefore to an object to which the centroid belongs. In addition, object connections may be determined based on the grouped keypoints.

The method is advantageous because by using refinement offset vectors for refining the location of keypoints, computationally complex upscaling operations can be avoided. In addition, by determining centroids and using the centroids for keypoint grouping and associating sets of keypoints to objects, also the tasks of keypoint grouping and association to objects can be handled with low computational complexity. Furthermore, the proposed method is less prone to false positive detections because—due to transforming keypoint locations to centroid locations—it is not necessary to provide keypoints which are not present on the image.

So, in an overall assessment, the method is more efficient and includes a higher reliability.

According to an embodiment, the neural network provides a set of affinity field vectors, the affinity field vectors providing information regarding connections between pairs of keypoints. More in detail, a set of affinity field vectors is a vector field which provides information regarding an existing object connection between a pair of keypoints. The sets of affinity field vectors can be used for keypoint grouping.

According to an embodiment, the affinity field vectors are used for determining pairs of keypoints which are interconnected by object connections. So, based on the set of affinity field vectors it is possible to determine if a connection between a pair of keypoints exits. The determination may be a verification step if a connection detected by considering information regarding centroids is correct or not. Thereby the risk of wrong keypoint grouping can be significantly reduced.

According to an embodiment, in case of keypoint ambiguities, affinity field vectors are used to remove keypoint ambiguities. Keypoints may include labels indicating a feature or position of the keypoint. For example, the feature may indicate that the keypoint is "right ear" or "left shoulder." In case that above-mentioned method detects two or more keypoints with the same label to a certain object, information included in affinity field vectors can be used for determining which of the keypoints is correctly associated to the object. Thereby the risk of wrong keypoint grouping can be significantly reduced.

According to an embodiment, a confidence heatmap and/or a centroid confidence heatmap is provided based on a grid which includes a lower resolution than the resolution of the image. Thereby, the computational effort for calculating confidence heatmaps and/or centroid confidence heatmaps can be significantly reduced. In order to mitigate the accuracy loss due to lowered resolution, in post-processing, the keypoint position can be refined based on refinement offset vectors.

According to an embodiment, the neural network provides confidence heatmaps, refinement offset vectors, centroid offset vectors and/or centroid confidence heatmaps for different types of objects. For example, a first type may be "human being" and a second type may be "vehicle". The neural network my provide information, which type of object is detected. The detection of different objects may be performed in parallel, i.e., the method may determine keypoints for different objects in a single detection procedure of the neural network. Preferably, only those keypoints are detected in association to an object which are actually present on the image. Thereby, the detection quality is significantly improved.

According to an embodiment, confidence heatmaps are grouped and/or labelled according to given types of keypoints. So, in other words, the keypoints may include an indicator as to which kind of keypoint is present at a certain position of the image (e.g. left elbow, right shoulder, etc.). Thereby, the determination of an object skeleton is significantly improved.

According to an embodiment, the step of grouping a set of keypoints to an object is performed based on searching nearest neighbored centroid to one or more keypoints. Thereby, the complexity of keypoint grouping is significantly reduced.

According to an embodiment, the step of grouping a set of keypoints to an object is performed by determining one or more centroid clusters, assigning a label to each centroid cluster and assigning the label of a certain centroid cluster to the keypoints by considering centroid offset vectors associated with the keypoints. So, the embodiment considers information which keypoints belong to which centroid to label keypoints associated with the same centroid in order to group the keypoints together and associate the grouped keypoints to an object.

According to an embodiment, the step of determining the centroid of one or more objects includes applying centroid offset vectors to the keypoint locations, leading to multiple provisional centroids and determining the centroid by applying an interpolation algorithm to the multiple provisional centroids. Thus, centroids are determined in an inward directed manner starting at keypoint positions. Thereby, inaccuracies in determining centroid offset vectors can be mitigated.

According to an embodiment, the method steps are executed by processing hardware included in a vehicle in order to process environment images surrounding the car and/or to process images captured from the interior of the vehicle. Specifically in automotive applications, the proposed method is advantageous because it provides low runtime and code complexity and is therefore highly suitable for automotive processing hardware which is typically very limited in processing power.

According to an embodiment, the method steps are executed by processing hardware included in a camera of a vehicle. So, in other words, at least the neural network tasks and preferably also the post-processing are performed in camera-internal processing hardware.

According to an embodiment, grouped keypoints of an object are connected for estimating the pose of the object. Thereby it is possible to derive information regarding future motion and/or future poses in order to coordinate driving maneuvers according to the estimated future motion/poses.

According to a further aspect, the present disclosure relates to a computer program product for determining keypoints of multiple objects included in an image and associating the keypoints to the respective objects. The computer program product includes a computer readable storage medium having program instructions embodied therewith. The program instructions are executable by a processor to cause the processor to perform the method according to anyone of preceding embodiments.

According to yet a further aspect, the present disclosure relates to a system for determining keypoints of multiple objects included in an image and associating the keypoints to the respective objects. The system includes a neural network and a post processing system coupled with the neural network. The system is configured to execute the steps of:
  providing confidence heatmaps by the neural network, the confidence heatmaps including a lower resolution than the image and therefore provide information regarding the rough location of keypoints;
  providing refinement offset vectors by the neural network, each refinement offset vector being associated with a certain keypoint, wherein each refinement offset vector provides information for refining the location of the associated keypoint;
  providing:
    a set of centroid offset vectors by the neural network, each centroid offset vector of the set of centroid offset vectors being associated with a keypoint, the centroid offset vector providing information regarding the distance and direction between the keypoint and the centroid of the object to which the keypoint belongs; or
    one or more centroid confidence heatmaps by the neural network, each centroid confidence heatmap including a lower resolution than the image and therefore provide information regarding the rough location of a centroid, wherein one or more centroid refinement offset vectors are provided by the neural network, each centroid refinement offset vector being associated with a centroid and providing information for refining the location of the associated centroid;
  determining the location of maximum value in the respective confidence heatmaps, using the location of maximum value in the respective confidence heatmaps as rough keypoint locations and refining the rough keypoint locations by adding refinement offset vectors, thereby obtaining refined keypoint locations;
  determining the centroids of the multiple objects by
    adding centroid offset vectors to the refined keypoint locations or the rough keypoint locations; or
    refining the rough centroid locations provided by centroid confidence heatmaps by adding a centroid refinement offset vector to the respective rough centroid location; and
  associating a set of keypoints to the objects based on the determined centroids of the objects.

Any above-mentioned feature described as an embodiment of the method is also applicable as a system feature in the system according to the present disclosure.

The term "vehicle" as used in the present disclosure may refer to a car, truck, bus, train or any other crafts.

The term "keypoint" as used in the present disclosure may refer to an object location or object point which characterizes the pose of the object. In case of a human being, the keypoint may be "eye", "ear", "shoulder", "elbow", "wrist", "hip", "knee", "ankle" etc.

The term "confidence heatmap" as used in the present disclosure may refer to a region of the object in which a keypoint is located and which is superimposed by a probability distribution, for example, a gaussian distribution. The probability distribution indicates according to which probability the keypoint is located at the location of the respective probability value.

The term "refinement offset vector" as used in the present disclosure may refer to a vector indicating at which distance and in which direction the rough keypoint location has to be moved in order to arrive at the actual keypoint location.

The term "centroid" as used in the present disclosure may refer to the center, specifically the gravity center, of an object.

The term "centroid offset vector" as used in the present disclosure may refer to a vector indicating at which distance and in which direction the rough centroid location has to be moved in order to arrive at the actual centroid location.

The term "centroid confidence heatmap" as used in the present disclosure may refer to a region of the object in which the centroid of an object is located and which is superimposed by a probability distribution. The probability distribution indicates according to which probability the centroid is located at the location of the respective probability value.

The term "object connection" as used in the present disclosure may refer to a direct connection of a pair of keypoints which forms part of an object skeleton. In case of a human object, an object connection may be, for example, a limb.

The term "essentially" or "approximately" as used in the present disclosure means deviations from the exact value by +/−10%, preferably by +/−5% and/or deviations in the form of changes that are insignificant for the function and/or for the traffic laws.

BRIEF DESCRIPTION OF THE DRAWINGS

Various aspects of the present disclosure, including its particular features and advantages, will be readily understood from the following detailed description and the accompanying drawings, in which.

DETAILED DESCRIPTION

Figure 1:
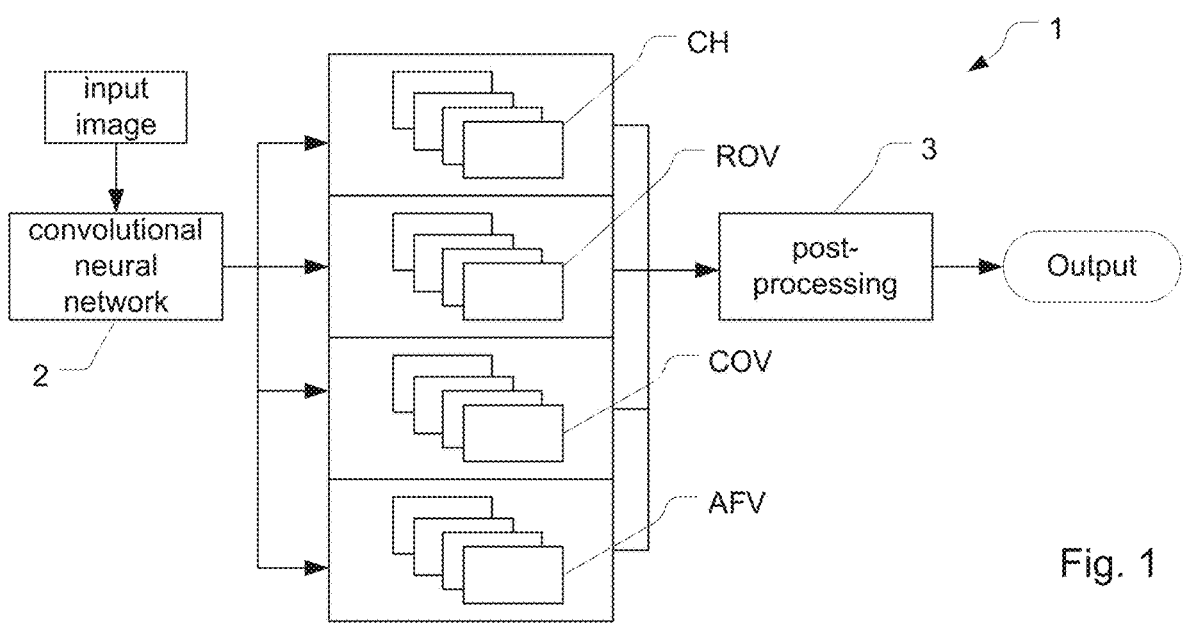
FIG. 1 shows an exemplary schematic diagram of a system for determining keypoints of multiple objects included in an image and associating the keypoints to the respective objects.

The present disclosure will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this present disclosure should not be construed as limited to the embodiments set forth herein. Throughout the following description similar reference numerals have been used to denote similar elements, parts, items or features, when applicable.

The features of the present disclosure disclosed in the specification, the claims, examples and/or the figures may both separately and in any combination thereof be material for realizing the present disclosure in various forms thereof.

FIG. 1 illustrates a system 1 for determining keypoints of multiple objects included in an image and associating the keypoints to the respective objects. An object may be, for example, a person, a vehicle etc. The image may include multiple objects of a single object class (e.g., multiple persons on the image) or may include multiple objects of different object classes (e.g., one or more persons and one or more cars).

The image may be provided by a camera, specifically a camera attached to or included in a vehicle.

The image is received by a neural network 2, which can be, for example, a convolutional neural network. The neural network 2 may be a trained neural network, i.e. the neural network 2 has been trained to specific tasks in advance in order to provide certain characteristics used for determining information regarding keypoints of multiple objects included in an image and information required for associating the keypoints to the respective objects.

As shown in FIG. 1, the neural network 2 provides different output information. First, the neural network 2 provides multiple confidence heatmaps CH. Each confidence heatmap CH defines a certain area on the image and is associated with a certain keypoint of an object (e.g. left elbow of a person). The confidence heatmap CH indicates that associated keypoint is located in the confidence heatmap CH. Neural network 2 may provide confidence heatmaps CH for each keypoint visible on the image.

According to embodiments, confidence heatmaps CH are labelled. Based on the labels, it is possible to determine the keypoint type, e.g., "right elbow", "right shoulder" etc.

Confidence heatmap CH further provides probability values over at least two dimensions of the image. The probability values may indicate according to which probability the keypoint is located at a certain area of the image. The probability values of the confidence heatmap CH may be arranged according to a Gaussian or Gaussian-like distribution.

In order to reduce computational complexity, the confidence heatmap CH may include a lower resolution than the image provided as an input to the neural network 2. For example, the confidence heatmap CH may include only ¼ to ¹⁄₁₀₀, specifically ⅛ of the resolution of the image. The resolution reduction leads to a loss of accuracy.

In order to mitigate loss of accuracy, neural network 2 provides refinement offset vectors ROV. Each refinement offset vector ROV is associated to a certain confidence heatmap CH. The refinement offset vector ROV provides correction information for correcting the position of maximum value of the associated confidence heatmap CH in order to precisely define the position on the image at which the keypoint (which is associated with the confidence heatmap CH) is located.

More in detail, the refinement offset vector ROV may be a vector defining a change of position of the maximum of confidence heatmap CH thereby mitigating accuracy loss induced by lowering the resolution of confidence heatmap CH compared to image resolution.

It is worth mentioning that refinement offset vector ROV is provided by the neural network 2, i.e., the mitigation of accuracy loss induced by lowering the resolution of confidence heatmap CH compared to image resolution has not to be provided by a complex refinement algorithm performed in post processing 3.

The neural network 2 may be trained based on ground truth information to estimate refinement offset vectors ROV. Ground truth information may include ground truth refinement offset vectors which are established by calculating a vector which starts at the rough location of the ground truth keypoint and ends at the exact location of ground truth keypoint location. The rough location of the ground truth keypoint is determined in the lower resolution of confidence heat map and the exact location may be determined in a higher resolution, namely the resolution of the image provided as an input to the neural network 2. Based on the ground truth information, it is possible to train the neural network 2 to estimate refinement offset vectors, for example, by using a loss function.

In addition, reference is made to the above-referenced "Objects as Points," by Zhou et al. which provides in section 3 an example loss function for training a neural network to provide vectors which mitigate loss of accuracy due to down sampling. The neural network 2 can be trained in a similar way to estimate refinement offset vectors ROV.

Furthermore, the neural network 2 may provide information regarding the centroid of one or more objects included in the image. The information regarding the centroid can be provided in different ways.

According to the embodiment of FIG. 1, neural network 2 provides centroid offset vectors COV. Each centroid offset vector COV is associated with a certain keypoint of an object. Each centroid offset vector COV provides displacement information indicating in which direction and how far a certain keypoint has to be shifted in order to arrive at the centroid of the object. So, in other words, based on centroid offset vector COV, a certain keypoint of an object can be shifted to the centroid location of the object.

According to another embodiment, neural network 2 may provide information regarding the centroid of one or more objects included in the image based on one or more centroid confinement heatmaps and one or more centroid refinement offset vectors.

Similar to upper-mentioned confinement heatmaps, centroid confinement heatmaps define a certain area on the image in which a centroid of an object is located. The centroid confidence heatmap further provides signal values over at least two dimensions of the image. The signal values may indicate according to which probability the centroid of an object is located at a certain area of the image. The signal values of the centroid confidence heatmap may be arranged according to a Gaussian or Gaussian-like distribution.

Also, the centroid confidence heatmap may include a lower resolution than the image provided as an input to the neural network 2. In order to mitigate loss of accuracy induced by the lowered resolution, neural network 2 provides one or more centroid refinement offset vectors. Each centroid refinement offset vector is associated with a certain centroid confidence heatmap. The centroid refinement offset vector provides correction information for correcting the position of maximum value of the associated centroid confidence heatmap in order to precisely define the position on the image at which the centroid is located.

More in detail, the centroid refinement offset vector may be a vector defining a change of position of the maximum of the centroid confidence heatmap thereby mitigating accuracy loss induced by lowering the resolution of the centroid confidence heatmap compared to image resolution.

It is worth mentioning that the centroid refinement offset vector may be provided by the neural network 2, i.e., the mitigation of accuracy loss induced by lowering the resolution of centroid confidence heatmap compared to image resolution has not to be provided by a complex refinement algorithm performed in post processing 3.

The neural network 2 may be trained based on ground truth information to estimate the centroid refinement offset vector. Ground truth information may include ground truth centroid refinement offset vectors which are established by calculating a vector which starts at the rough location of the ground truth centroid and ends at the exact location of ground truth centroid. The rough location of the ground truth centroid is determined in the lower resolution of the centroid confidence heat map and the exact location may be determined in a higher resolution, namely the resolution of the image provided as an input to the neural network 2. Based on the ground truth information, it is possible to train the neural network 2 to estimate centroid refinement offset vectors, for example by using a loss function.

In addition, reference is further made to the above-identified "Objects as Points" by Zhou et al., which provides in section 3 an example loss function for training a neural network to provide vectors which mitigate loss of accuracy due to down sampling. The neural network 2 can be trained in a similar way to estimate centroid refinement offset vectors.

Finally, according to an embodiment, the neural network 2 may provide one or more sets of affinity field vectors AFV. A set of affinity field vectors is a vector field indicating a given connection between a pair of keypoints. For example, a set of affinity field vectors may indicate the connection between a first keypoint "right shoulder" and a second keypoint "right elbow", i.e., may be indicative for a limb of a person. The vectors included in the set of affinity field vectors are aligned according to the existing connection.

The sets of affinity field vectors may be used to associate keypoints to certain objects and/or to remove ambiguities, as described below in greater detail.

Output information of the neural network 2 may be provided to a post-processing system 3 which is configured to process received information in order to determine keypoints, determine associations of keypoints to certain objects and determine existing connections between keypoints in order to build a skeleton of the object.

Figure 2:
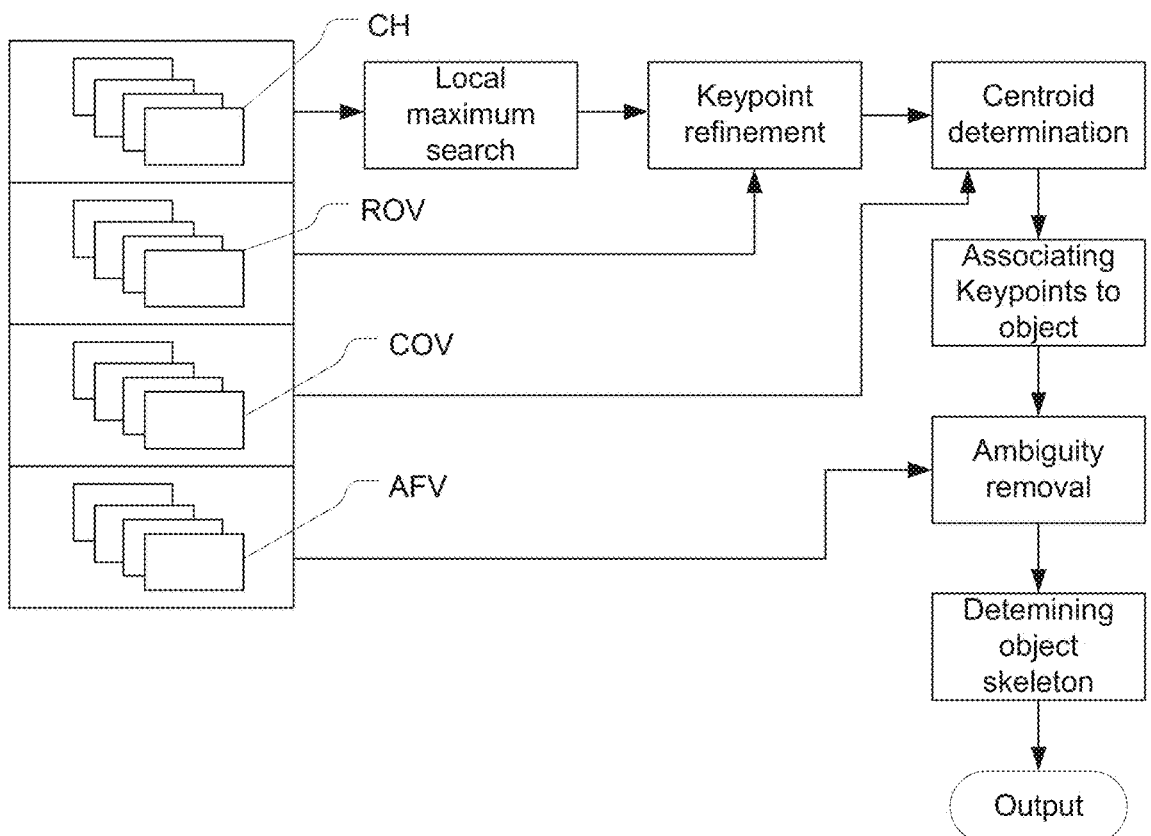
FIG. 2 schematically illustrates the steps performed in the post processing system of the system according to FIG. 1.

FIG. 2 shows processes performed by post processing system 3 in closer detail.

The confidence heatmaps CH provided by the neural network 2 may be parsed in order to determine local maximum. In other words, the peak of each confidence heatmap CH is determined in order to obtain rough location information of the keypoints associated with the respective confidence heatmap. The confidence heatmaps CH may be provided on a grid. The local maximum of a confidence heatmap CH may be arranged at an intersection of grid lines.

Figure 3:
FIG. 3 shows an exemplary image on which the method is applied.

FIG. 3 shows an example image which shows two objects, namely two ballet dancers.

Figure 4:
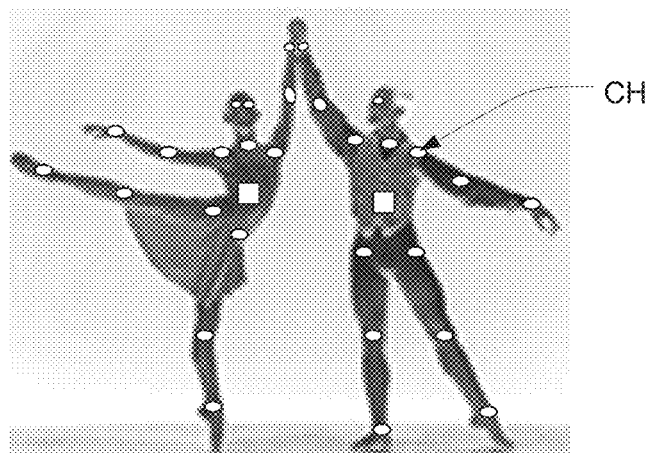
FIG. 4 illustrates keypoints and centroids of the image according to FIG. 3.

In FIG. 4, confidence heatmaps of the objects shown in FIG. 3 are highlighted by white ovals and centroids of the objects are highlighted by white squares.

Figure 5:
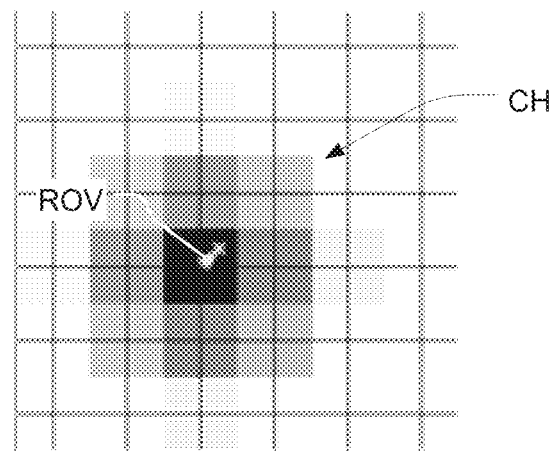
FIG. 5 illustrates a confidence heatmap and a refinement offset vector, both being associated with a certain keypoint.

FIG. 5 exemplarily shows a certain confidence heatmap CH which is provided on top of a grid. Different grey-scales of squares indicate the probability value at the respective position. The peak probability value is located in the middle, indicated by the black square.

Returning to FIG. 2, after searching local maximum, a keypoint refinement is performed based on information provided by refinement offset vector ROV. As mentioned before, refinement offset vector ROV is associated with a certain confidence heatmap CH. Due to lowered resolution of confidence heatmap CH, the determined local maximum only roughly indicates the location of the keypoint.

By applying refinement offset vector ROV to the local maximum, a refined position of the keypoint is determined. In other words, loss of accuracy is mitigated by shifting the position of the local maximum according to information provided by refinement offset vector ROV.

FIG. 5 exemplarily shows local maximum shifting by refinement offset vector ROV, indicated by the white arrow in the middle of the black square. By applying refinement offset vector ROV to the local maximum of confidence heatmap CH, the refined position of the keypoint is determined which is indicated by the white cross in the area of the tip of the white arrow.

Again returning to FIG. 2, after keypoint refinement, centroids of objects included in the image are determined.

As mentioned before, determination of centroids can be performed in different ways. The embodiment shown in FIG. 2 uses centroid offset vectors COV for determining a centroid of an object.

Each centroid offset vector COV is associated with a certain keypoint. By applying the centroid offset vector COV to its associated keypoint, the position of centroid of the object, to which the keypoint belongs, or at least an estimate of the position of centroid, can be established.

Figure 6:
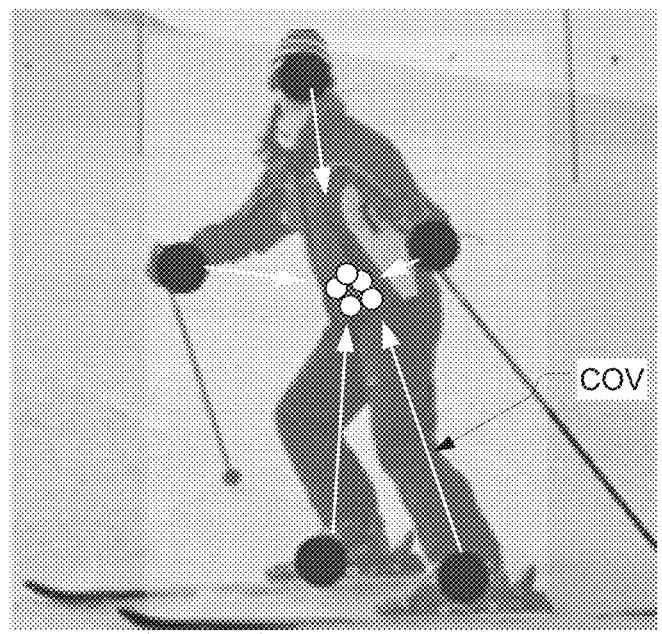
FIG. 6 schematically illustrates a process for determining the centroid of an object by using multiple centroid offset vectors.

FIG. 6 exemplarily shows multiple keypoints of an object, indicated by black dots, and a set of centroid offset vectors COV, indicated by white arrows. Each centroid offset vector COV is associated with a certain keypoint. When applying a shift operation according to the centroid offset vector COV to the keypoint, an estimate of the centroid is obtained, indicated by a white dot in the centre of the skier. The estimated centroid obtained by the shifting operation may not exactly be located at the actual centroid of the object. However, by considering all estimated centroids and applying an averaging algorithm to the estimated centroids, the actual centroid can be derived.

According to another embodiment, as mentioned before, centroids of objects included in the image can also be determined based on centroid confidence heatmaps and centroid refinement offset vectors, each centroid refinement offset vector corresponding to one of the centroid confidence heatmaps. The location of maximum of centroid confidence heatmap indicates the rough position of centroid. The exact location of centroid is derived by shifting the rough position of centroid based on information included in corresponding centroid refinement offset vector.

Again returning to FIG. 2, after determination of the centroid, keypoints are associated with a certain object. So in other words, in case of multiple keypoints present on the image, a decision is made as to which keypoint belongs to which object.

The keypoints provided by the neural network 2 may be labelled. The keypoint label may indicate at which position the keypoint is located at the object. For example, the label of a keypoint belonging to a person may, for example, indicate "left elbow" or "right shoulder."

However, in case of multiple keypoints with the same label category, the association of keypoints to objects has to be determined, i.e., for example, which "right shoulder" belongs to which person.

According to a first example embodiment, association of keypoints with objects can be determined based on a "next neighbour search" algorithm. So in other words, a certain keypoint is associated with the object by considering which centroid of an object is closest to the keypoint.

According to a second example embodiment, information provided by centroid offset vectors COV can be used to associate keypoints to objects. As mentioned before, centroid offset vectors COV provide information regarding the direction and distance of a certain keypoint to the centroid of the object to which the keypoint belongs to. Said information can be used for keypoint-object-association.

For example, a clustering algorithm may be used for determining clusters which include the rough centroid locations obtained by applying centroid offset vectors COV to the keypoints. Example clustering mechanisms may be, for example, K-means algorithm or EM algorithm (EM: expectation maximization). Each cluster may be provided by a label which indicates a certain object. Using the knowledge of centroid offset vectors COV, the label provided to the cluster can also be provided to the set of keypoints which correspond to the centroid offset vectors COV (cf. FIG. 6). Thereby, a set of keypoints can be determined belonging to a certain cluster, respectively, to a certain object.

Figure 7:
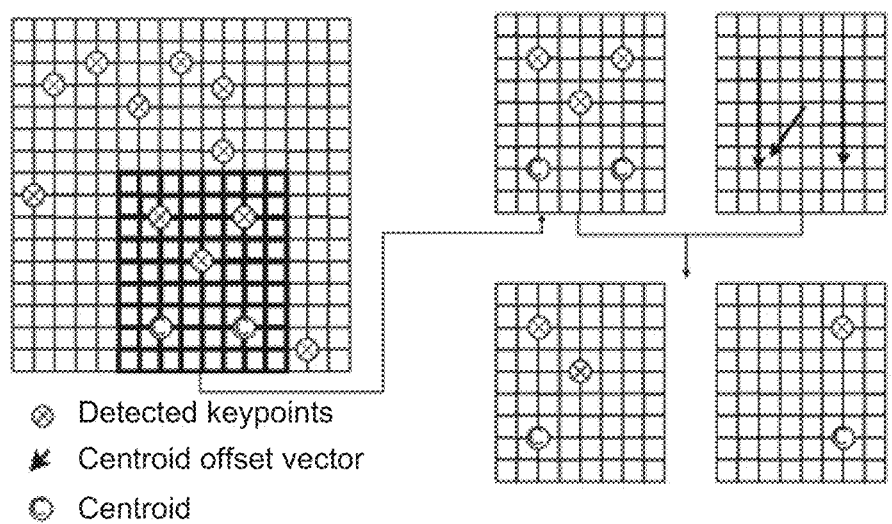
FIG. 7 schematically illustrates the process of associating keypoints to centroids based on centroid offset vectors.

FIG. 7 schematically illustrates the association of keypoints to objects based on a "clustering" algorithm. Detected keypoints are indicated by X and detected centroids are indicated by C. The arrows indicate the centroid offset vectors COV. By considering the centroid offset vector COV information, a grouping of keypoints to centroids, respectively, to objects can be obtained.

According to a third embodiment, keypoint grouping can be also obtained by using affinity field vectors AFV. As mentioned before, each set of affinity field vectors provides information regarding keypoint coupling, i.e., which keypoint is coupled with which further keypoint by an object connection. Such object connection may be, for example, a limb of a person. By considering information included in the affinity field vectors, grouping of keypoints to objects can be obtained because only keypoint pairs which are interconnected by affinity field vectors can belong to a certain object.

Figure 8:
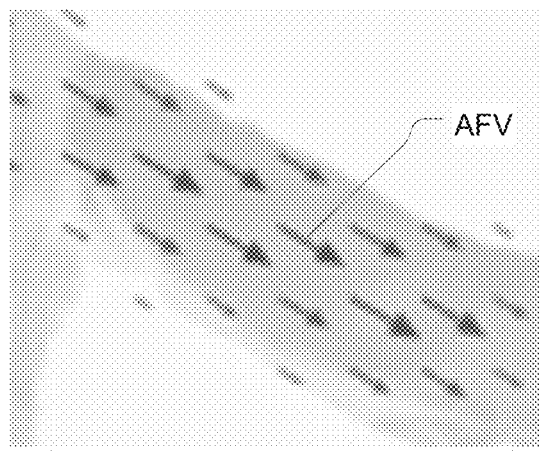
FIG. 8 illustrates multiple affinity field vectors being arranged between a pair of keypoints.

FIG. 8 provides a set of affinity field vectors. The affinity field vectors may indicate, for example, the coupling of two keypoints "shoulder" and "elbow". The affinity field vectors are aligned according to the object connection, for example, the orientation of the limb.

After associating keypoints to objects included in the image, there may occur ambiguities. For example, one object may include multiple keypoints belonging to the same keypoint label, e.g., multiple "left shoulders". In order to remove such ambiguities, affinity field vectors AFV can be used to check which keypoint actually belongs to the object and remove the at least one further keypoint association. The removal of ambiguities may be specifically advantageous in embodiments which use "next neighbour search" or "clustering" mechanisms for obtaining keypoint-object-association because in the embodiments, affinity field vectors AFV have not been used for obtaining keypoint-object-association.

Finally, after ambiguity removal, the skeleton of the object is developed. The skeleton development may be, for example, obtained by connecting keypoints associated to a certain object according to keypoint labels. Such connecting may include, for example, coupling associated keypoints according to a known structure of the object, e.g., a "left wrist" keypoint with a "left elbow" keypoint and a "left elbow" keypoint with a "left shoulder" keypoint.

Figure 9:
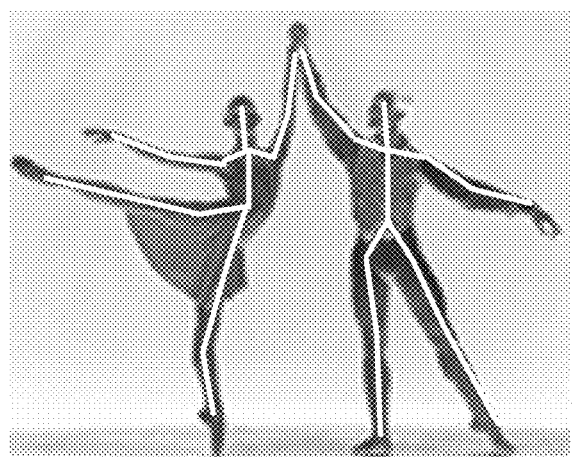
FIG. 9 illustrates detected skeletons of the image according to FIG. 3.

FIG. 9 illustrates detected object skeletons for the images according to FIGS. 3 and 4. The skeletons determined based on detected keypoints are indicated by white lines.

The artificial neural network 2 may be trained by using images which are manually labelled before using it for training purposes. The labels provided to the images are also referred to as ground truth data. For example, ground truth data may provide a bounding box to each object indicating the extent of the object. Based on the bounding box, the centroid of an object can be determined, for example by calculating the center coordinate of the bounding box and using that center coordinate as the centroid location of the object.

In addition, ground truth data may provide information regarding where the keypoints of the object are located. Furthermore, ground truth data may provide information regarding the type of keypoint, e.g., left shoulder, right ear, left knee, etc., or in case of a vehicle as an object, left exterior mirror, right headlight, etc.

By using the ground truth data, the artificial neural network 2 can be trained to estimate confidence heatmaps, rough keypoint locations, refinement offset vectors, centroid offset vectors, centroid refinement offset vectors, and/or centroid confidence heatmaps.

Some processes performed by post-processing system 3 have been described before in connection with certain embodiments. In addition, post-processing system 3 may perform further tasks like pose estimation, providing bounding boxes around objects based on detected keypoints (also 3D by regressing the depth-wise extension of an object), providing a prediction of relationship between objects (e.g., detecting a motorcycle and a person close to the motorcycle thereby taking the decision "motorcyclist"), 3D keypoint detection by regressing or tracking distance of keypoints, 3D orientation of an object (e.g., by determining roll, pitch and yaw of the object with respect to the camera) and object tracing by regressing the temporal offset of the keypoint coordinates.

The present disclosure can be used for keypoint and object detection in the surrounding of a vehicle. However, according to another embodiment, it may also be possible to monitor the interior of the vehicle based on a camera and to detect keypoints of people within the car in order to derive information regarding vehicle passengers, e.g., the readiness of the driver to take over the car in autonomous driving situations.

Figure 10:
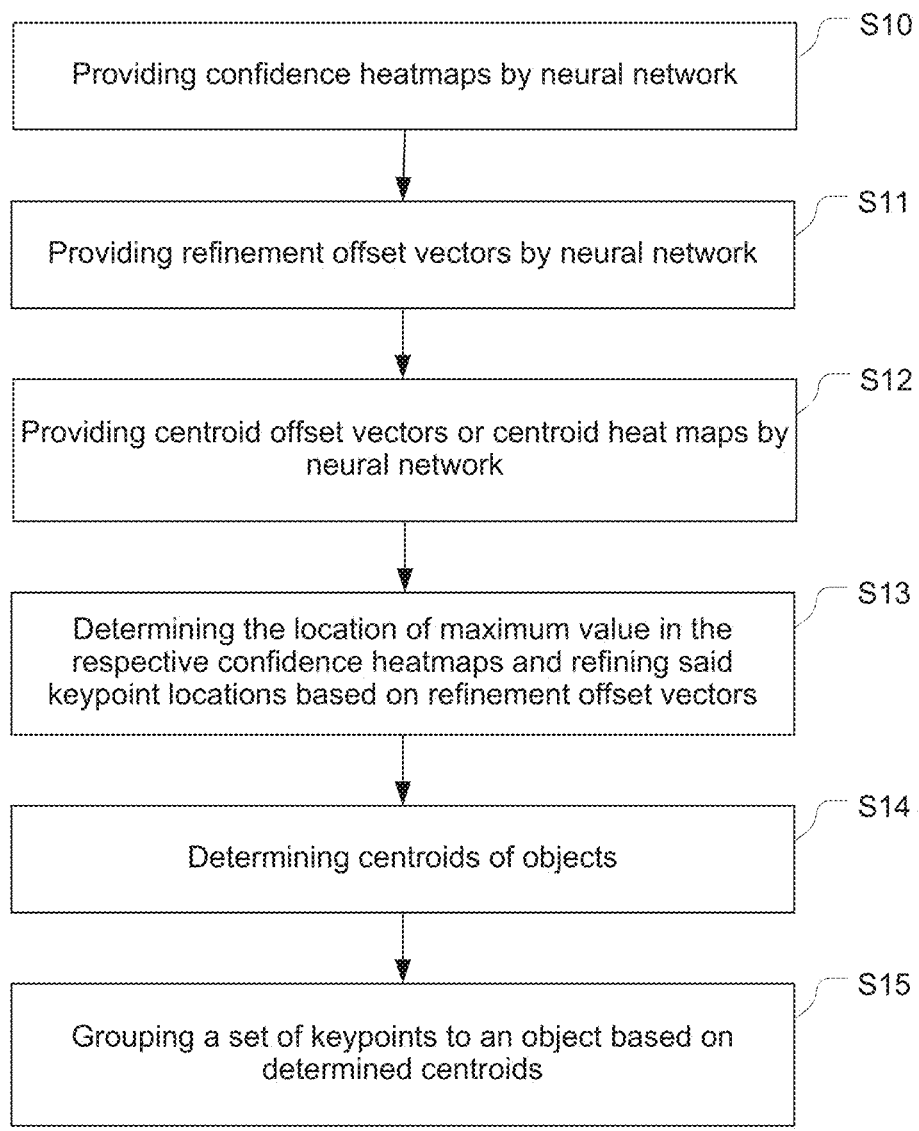
FIG. 10 shows a schematic block diagram illustrating the steps of a method for determining keypoints of multiple objects included in an image and associating the keypoints to the respective objects.

FIG. 10 shows a block diagram illustrating the method steps of a method for determining keypoints of multiple objects and associating the keypoints to objects.

As a first step, multiple objects may be detected in an image. Each object includes a centroid and multiple keypoints.

Subsequently, confidence heatmaps are provided by the neural network (S10). The confidence heatmaps provide information regarding the rough location of keypoints.

After providing confidence heatmaps, refinement offset vectors are provided by the neural network (S11). Each refinement offset vector ROV is associated with a certain keypoint and provides information for refining the location of the associated keypoint.

After providing confidence heatmaps, centroid offset vectors COV or centroid heat maps CH are provided by neural network (S12).

As a further step, the location of the maximum value in the respective confidence heatmaps CH is determined which defines rough keypoint location. The rough keypoint locations are refined based on refinement offset vectors (S13).

As a further step, centroids of objects included in the image are determined (S14).

Finally, the determined keypoints are grouped based on determined centroids (S15).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 system
2 neural network
3 post processing
AFV affinity field vector
CH confidence heatmap
COV centroid offset vector
ROV refinement offset vector

The invention claimed is:

1. A computer-implemented method for determining keypoints of multiple objects included in an image and associating the keypoints to the respective objects based on a neural network and a post processing system coupled with the neural network, the method comprising:
 providing confidence heatmaps by a neural network, the confidence heatmaps comprising a lower resolution than the image and therefore provide information regarding a rough location of keypoints of interest;
 providing refinement offset vectors by the neural network, each refinement offset vector being associated with a certain keypoint, wherein each refinement offset vector provides information for refining the location of the associated keypoint;
 providing:
  a set of centroid offset vectors by the neural network, each centroid offset vector of the set of centroid offset vectors being associated with a keypoint, the centroid offset vector providing information regarding a distance and direction between the keypoint and a centroid of the object to which the keypoint belongs; or
  one or more centroid confidence heatmaps by the neural network, each centroid confidence heatmap comprising a lower resolution than the image and therefore provide information regarding a rough location of a centroid, wherein one or more centroid refinement offset vectors are provided by the neural network, each centroid refinement offset vector being associated with a centroid and providing information for refining a location of the associated centroid;
 determining a location of maximum value in the respective confidence heatmaps, using the location of maximum value in the respective confidence heatmaps as rough keypoint locations and refining the rough keypoint locations by adding the refinement offset vectors, thereby obtaining refined keypoint locations;
 determining the centroids of the multiple objects by adding the centroid offset vectors to the refined keypoint locations or the rough keypoint locations; or refining the rough centroid locations provided by the centroid confidence heatmaps by adding a centroid refinement offset vector to the respective rough centroid location; and associating keypoints to the objects based on the determined centroids of the objects.

2. The method according to claim 1, wherein the neural network provides a set of affinity field vectors, the affinity field vectors providing information regarding connections between pairs of keypoints.

3. The method according to claim 2, wherein the affinity field vectors are used for determining pairs of keypoints which are interconnected by object connections.

4. The method according to claim 2, wherein in case of keypoint ambiguities, affinity field vectors are used to remove keypoint ambiguities.

5. The method according to claim 1, wherein the neural network provides the confidence heatmaps, the refinement offset vectors, the centroid offset vectors and/or the centroid confidence heatmaps for different types of objects.

6. The method according to claim 1, wherein the confidence heatmaps are grouped and/or labelled according to given types of the keypoints.

7. The method according to claim 1, wherein associating keypoints to the objects is performed based on searching a nearest neighbored centroid to one or more keypoints.

8. The method according to claim 1, wherein associating keypoints to objects is performed by determining one or more centroid clusters, assigning a label to each centroid cluster and assigning the label of a certain centroid cluster to the keypoints by considering the centroid offset vectors associated with the keypoints.

9. The method according to claim 1, wherein determining the centroids of the objects comprises applying the centroid offset vectors to the keypoint locations, leading to multiple provisional centroids, and determining a centroid by applying an interpolation algorithm to the multiple provisional centroids.

10. The method according to claim 1, wherein the method is executed by processing hardware included in a vehicle in order to at least one of process environment images surrounding the vehicle or process images captured from an interior of the vehicle.

11. The method according to claim 1, wherein the method is executed by processing hardware included in a camera of a vehicle.

12. The method according to claim 1, wherein keypoints associated with an object are connected for estimating a pose of the object.

13. A computer program product for determining keypoints of multiple objects included in an image and associating the keypoints to the respective objects, the computer program product comprising a non-transitory computer readable storage medium having program instructions embodied therewith, the program instructions being executable by a processor to cause the processor to perform the method according to claim 1.

14. A system for determining keypoints of multiple objects included in an image and associating the keypoints to the respective objects, the system comprising a neural network and a post processing system coupled with the neural network, the system further being configured to execute:

providing confidence heatmaps by the neural network, the confidence heatmaps comprising a lower resolution than the image and therefore provide information regarding a rough location of keypoints of interest;

providing refinement offset vectors by the neural network, each refinement offset vector being associated with a certain keypoint, wherein each refinement offset vector provides information for refining a location of the associated keypoint;

providing:
a set of centroid offset vectors by the neural network, each centroid offset vector of the set of centroid offset vectors being associated with a keypoint, each centroid offset vector providing information regarding a distance and direction between the associated keypoint and a centroid of the object to which the keypoint belongs; or one or more centroid confidence heatmaps by the neural network, each centroid confidence heatmap comprising a lower resolution than the image and therefore provides information regarding a rough location of a centroid, wherein one or more centroid refinement offset vectors is provided by the neural network, each centroid refinement offset vector being associated with a centroid and providing information for refining a location of the associated centroid;

determining a location of maximum value in the respective confidence heatmaps, using the location of maximum value in the respective confidence heatmaps as rough keypoint locations and refining the rough keypoint locations by adding refinement offset vectors, thereby obtaining refined keypoint locations;

determining the centroids of the multiple objects by
adding centroid offset vectors to the refined keypoint locations or the rough keypoint locations; or refining the rough centroid locations provided by centroid confidence heatmaps by adding a centroid refinement offset vector to the respective rough centroid location; and associating a set of the keypoints to the objects based on the determined centroids of the objects.

* * * * *